UNITED STATES PATENT OFFICE.

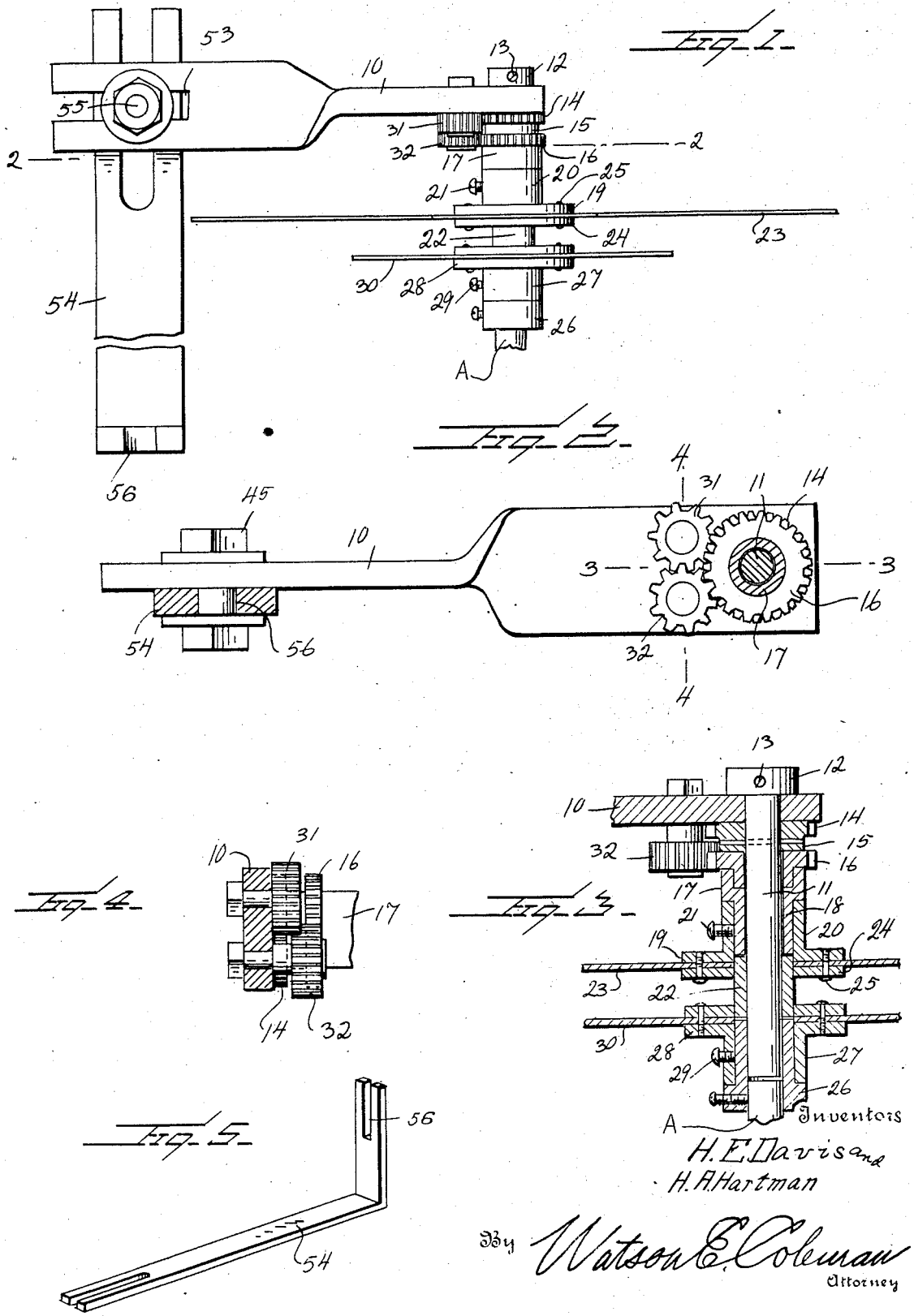

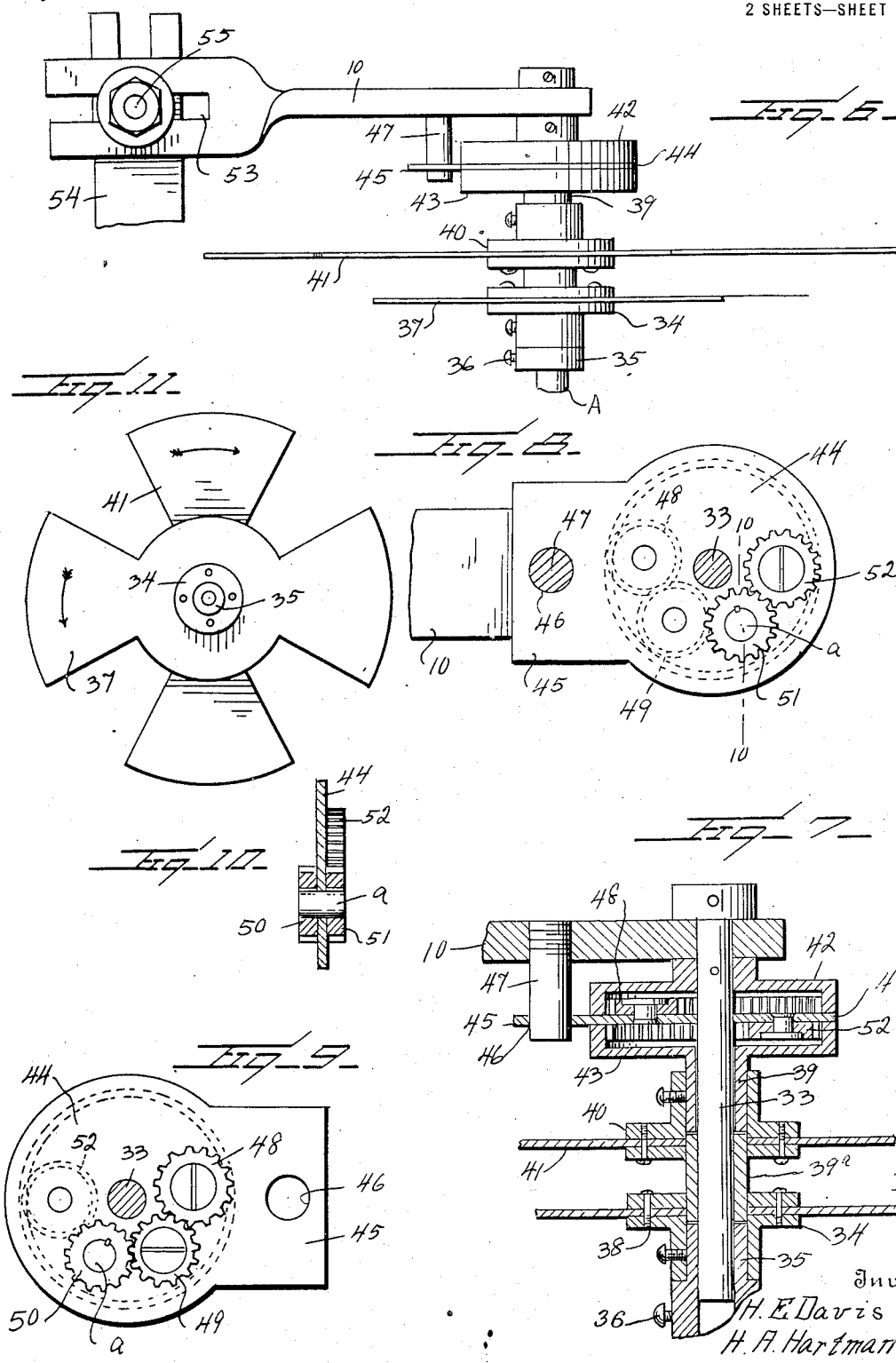

HARRY E. DAVIS AND HARRY A. HARTMAN, OF MILTON, PENNSYLVANIA.

SHUTTER FOR MOTION-PICTURE MACHINES.

1,330,519.     Specification of Letters Patent.     Patented Feb. 10, 1920.

Application filed June 14, 1919. Serial No. 304,311.

*To all whom it may concern:*

Be it known that we, HARRY E. DAVIS and HARRY A. HARTMAN, citizens of the United States, residing at Milton, in the county of Northumberland and State of Pennsylvania, have invented certain new and useful Improvements in Shutters for Motion-Picture Machines, of which the following is a specification, reference being had to the accompanying drawings.

This invention relates to shutters for motion picture machines, and particularly to double shutters, that is a pair of shutters having oppositely projecting wings and rotating in opposite directions at the same speed.

The general object of this invention is to provide a double shutter of this character with improved gearing whereby the shutters may be driven, which gearing is of a very simple and positive character, will not get out of order, and in which the gears are always held in proper mesh and in proper line.

A further object is to provide a construction of this character in which the gears or spur pinions for driving the concentric shafts of the shutters are inclosed within a casing or housing whereby the gears may run in oil, thus securing a very easy movement for the gears, increasing their life, and protecting them from dust and dirt.

A further object is to provide a construction of this character in which the several parts may be readily separated from each other to permit of adjustment and repair.

Other objects will appear in the course of the following description.

Our invention is illustrated in the accompanying drawings, wherein:—

Figure 1 is a top plan view of one form of our shutter operating mechanism;

Fig. 2 is a section on the line 2—2 of Fig. 1;

Fig. 3 is a section on the line 3—3 of Fig. 2;

Fig. 4 is a fragmentary elevation of the gearing shown in Figs. 1 and 2;

Fig. 5 is a perspective view of the bracket member 54;

Fig. 6 is a top plan view of a preferred form of our mechanism;

Fig. 7 is a fragmentary longitudinal sectional view of the construction shown in Fig. 6;

Fig. 8 is a face view of the plate 44 and its gearing, the pin 47 and the shaft 33 being in section;

Fig. 9 is a face view of the plate 44 from the opposite side to that shown in Fig. 8;

Fig. 10 is a section on the line 10—10 of Fig. 8; and

Fig. 11 is a face view of the shutters.

In Figs. 1 to 5 we show the simplest form of our invention, and in these figures 10 designates a supporting bracket which is supported in any suitable manner, as for instance, by a supplementary bracket to be later described, attached to one of the magazines of the machine. This bracket 10 at its upper end is provided with a bearing for a shaft 11 extending out at right angles to the bracket, this shaft being held in engagement with the bracket by a collar 12 and set screw 13. Mounted upon the shaft inward of the bracket 10 is the spur gear 14 having a hub 15 pinned to the shaft. Surrounding the shaft and loosely mounted thereon is a spur pinion 16 having the same diameter and pitch as the pinion 14 and connected to rotate with the enlarged end of the sleeve 17. The sleeve 17 is reduced, at 18, and the sleeve 17 and the pinion 16 rotate freely on the shaft 11. Mounted upon the reduced portion 18 of the collar is a disk 19, having an elongated hub 20 held in place on the sleeve 17 by a set screw 21. Disposed around the shaft 11 beyond the extremity of the reduced portion of the sleeve 17 is a spacing collar 22 having its exterior diameter the same as the interior diameter of the hub 20 of disk 19. Attached to this disk 19 is one of the shutters 23, having the form illustrated in Fig. 11, and confronting the disk 19 is a complementary disk 24. Screws 25 pass through these two disks and through the shutter 23. This shutter is, of course, of thin metal and clamped tightly between the two disks. Mounted upon the shaft 11 and rotating therewith and projecting beyond the shaft is a sleeve 26 which is reduced for a portion of its length, and mounted upon this sleeve is the hub 27 of a disk 28 held in place on the sleeve 26 by means of a set screw 29. A shutter 30 is clamped against this disk and is held in place by screws in the same manner as the shutter 23.

Rotatably mounted upon the bracket 10 is a pinion 31 which meshes with the pinion 14 but is wider than that pinion, and meshing with the pinion 31 is a pinion 32 which projects behind the pinion 31, and in turn meshes with the pinion 16. It will thus be seen that upon a rotation of the shaft 11 in one direction, the pinion 16, collar 17, and the shutter 23 will be rotated in the opposite direction from the shaft and the shutter 28.

In Figs. 6 to 10 is shown another embodiment of the invention, which is believed to be preferable. In this construction, the bracket 10 carries, as before described, the longitudinally extending shaft 33, which shaft rotates within the bracket. Mounted upon the outer end of the shaft to rotate therewith is a disk 34 which is of exactly the same construction as the disk 28, illustrated in Fig. 3, and therefore needs no further description. This disk has a hub or sleeve engaged with a sleeve 35 mounted to rotate with the shaft 33, this sleeve 35 projecting beyond the shaft and being provided with a set screw 36 whereby it may be coupled to the regular shutter driving shaft A of the moving picture machine. Carried by the disk 34 is the shutter 37, this shutter being held in place against the disk 34 by screws 38. Loosely mounted upon the shaft 33 is a sleeve 39, and mounted on this sleeve to rotate therewith is a disk 40 which carries the shutter 41 in the manner heretofore described. This disk 40 is held on the sleeve 39 by means of a set screw, and a spacing collar 39ᵃ is disposed between the sleeve 39 and the sleeve 35.

So far, all the parts are practically the same as those heretofore described, but in place of having the transmission gears exposed, we provide a construction in which the gearing is entirely housed. To this end, there is mounted upon the shaft 33, adjacent the bracket 10, a disk 42 having a peripheral flange formed with internal teeth. This disk 42 with its flanged, internal teeth constitutes an internal gear wheel and also a half section of a housing. Mounted upon and rotatable with the collar 39 is a disk 43, whose flange projects toward the disk 42 and is formed with interior teeth. Disposed between these two sections 42 and 43 is a plate 44 which is generally circular in form, but is provided with a lateral extension 45 perforated, at 46, for the passage of a screw or pin 47 extending from the bracket 10 and holding this plate from movement. This plate carries the train of pinions whereby motion is communicated from the shaft 33 to the collar 39. On one face of the plate 44 there are provided three pinions 48, 49 and 50. The pinion 48 meshes with the interior teeth on the internal gear 42 and meshes with the pinion 49, and the pinion 49 meshes with the pinion 50. The shaft $a$ of the pinion 50 extends through the plate and carries upon the opposite face of the plate a pinion 51 which meshes with a pinion 52 of slightly larger diameter, which in turn meshes with the internal gear teeth on the internal gear 43. It will be noted that the pinions 48 and 52 are larger than the pinion 50, and that the pinion 51 has the same size as the pinions 48 and 52.

It will be seen that this train of gears will be driven by the rotation of the internal gear 42, and that through this train of gears, the internal gear 43 will be driven in the reverse direction to 42. The hub of the internal gear 43 is gripped by the clamping collar 39 and thus this internal gear wheel 43, the clamping collar 39, and the shutter 41 will rotate in the reverse direction from the shutter 37. In this construction, of course, the internal gear wheels 42 and 43, which abut against the fixed plate 44, form a housing entirely inclosing the train of gears and preventing dust from settling upon these gears, and further providing means whereby the gears may be kept well lubricated at all times so as to run easily. Of course, it is obvious that ball bearings might be provided for the bearings through which the shaft 33 passes.

The bracket 10 is shown at its outer end as being slotted, at 53, and an angular bracket 54 is used in conjunction with the bracket 10, the extremities of this bracket being longitudinally slotted. A bolt or like clamping member 55 holds the brackets 10 and 54 in conjunction with each other in any desired angle or in any desired adjustment, and the extremity of the bracket 54 is longitudinally slotted, as at 56, to provide for its attachment to the magazine and its adjustment thereon. By means of these brackets 10 and 54, the shutter may be applied to any form of motion picture machine with outside shutter in five minutes' time. By using the double shutter, a great improvement is secured in the light and in the steadiness of the picture. There is much less "flicker" than is usually found in motion picture machines. Steadiness of movement of the shutters is secured by the mechanism which transmits power from the central shaft to the outer, concentric shaft which carries the second shutter. Heretofore, beveled pinions have been used for the purpose of transmission and these beveled pinions have required constant adjustment. They do not wear regularly, and tend shortly to give the shutters irregularity of movement, which is entirely obviated by the construction illustrated. The transmission of gearing from the shutter drive shaft 11 is accomplished by means of flat gears, that is gears having radially extending teeth and disposed in parallel planes. These gears give a straight pull, they are noiseless, and wear a relatively long time without requiring replacement or adjustment. Any lost motion in the shutter driving gears is detrimental to the proper projection of the pictures as the pictures so projected, if the shutter blades do not rotate properly, are hazy and indistinct.

It will be further seen that the mechanism is very simple, and that it may be readily assembled or as readily taken apart in order to replace or repair any parts which may have become injured. It will further be seen that inasmuch as the pinions are carried upon the plate 44, the plate may be readily taken off of the shaft 33 in order to repair or replace the pinions. This makes the construction particularly easy to keep in proper order.

The advantages of the mechanism herein described are that it can be attached to any machine having an outside shutter without interfering with the mechanism of the machine. The shutter driving mechanism is at the end of the shutter shaft and is carried by a brace which supports the extremity of the shutter shaft and thus eliminates all vibration of the shutter shaft. Both shutters derive their motive power direct from the shutter shaft only and not from any additional shaft. The shutter blades can be adjusted without trouble or inconvenience at any time, and the gearing illustrated in Figs. 6 and 7 can be run in oil, which provides for relatively long wear. It is to be also noted that the two shutters, the gearing for driving them, and a shaft section, as 11 in Fig. 3 or 33 in Fig. 7, can all be mounted upon the supporting member 10 (the member 44 in Fig. 7 being to all intents and purposes a part of the member 10) so that these two shutters with their driving mechanism may be applied by means of a clamping sleeve or collar, as illustrated in Fig. 3, to the ordinary shaft of a moving picture machine. In other words, the construction illustrated in Fig. 3 or that illustrated in Fig. 7 can be formed as a unit to be applied to or removed from any of the ordinary machines on the market.

It will be understood, of course, that the shafts 11 and 33 are to be driven in any usual or suitable manner. No driving means is illustrated, however, as this will be obvious.

We claim:—

1. In a moving picture machine, a rotating shutter shaft constituting a driving shaft, a shutter and an associated spur gear wheel fixed thereto, a second shutter and an associated spur gear wheel loose on the driving shaft, a spur pinion with which the first named gear wheel meshes, a second spur pinion meshing with the first named pinion, a third spur pinion meshing with the second named gear wheel, and means for transmitting motion from the second pinion to the third pinion to drive the second named gear wheel in an opposite direction to the first named gear wheel, said pinions and gear wheels rotating in parallel planes at right angles to the axis of said driving shaft.

2. A shutter carrying a driving attachment for moving picture machines comprising a supporting member adapted to be mounted upon the machine, a shaft section having its outer end rotatably mounted in the supporting member and having means at its other end whereby it may be coupled to the shutter shaft of a motion picture machine, a shutter and an associated spur gear wheel fixed upon said shaft to rotate therewith, a second shutter and an associated spur gear wheel loosely mounted on the shaft, a spur pinion with which the first gear wheel meshes, a second spur pinion meshing with the first pinion, a third spur pinion meshing with the second named gear wheel, and means for transmitting motion from the second named pinion to the third named pinion, said pinions being operatively supported on and carried entirely by said supporting member.

3. A shutter actuating mechanism for moving picture machines comprising a shutter shaft, a shutter mounted upon the shaft to rotate therewith, a tubular shaft surrounding the first named shaft, a shutter mounted thereon to rotate therewith, and means for rotating the shutters in reverse directions including facing internal gear wheels having radially extending teeth mounted upon the two shafts to rotate respectively therewith, an intermediate member held from rotation and carrying a train of pinions disposed in planes parallel to the planes of the gear wheels including pinions meshing respectively with the two internal gear wheels, said pinions upon being driven by the internal gear wheel mounted upon the first named shaft causing a rotation in the reverse direction of the internal gear wheel mounted upon the tubular shaft.

4. A shutter actuating mechanism for moving picture machines comprising a shutter shaft, a shutter mounted upon the shaft to rotate therewith, a tubular shaft surrounding the first named shaft, a shutter mounted thereon to rotate therewith, and means for rotating the shutters in reverse direction including facing internal gear wheels mounted upon the two shafts to rotate respectively therewith, an intermediate member held from rotation, a train of three pinions mounted upon one face of the intermediate member, one of said pinions engaging with the internal gear wheel mounted upon the first named shaft, the pinion at the opposite end of said train having its shaft extending through the member, a pinion mounted on the inner end of this shaft, and a pinion meshing with this last named pinion and also meshing with the internal gear wheel attached to the tubular shaft whereby to secure a rotation of the tubular shaft reverse to that of the first named shaft.

5. A shutter actuating mechanism for moving picture machines comprising a shutter shaft, a shutter mounted upon the shaft to rotate therewith, a tubular shaft surrounding the first named shaft, a shutter mounted thereon to rotate therewith, and means for rotating the shutters in reverse directions including facing internal gear wheels mounted upon the two shafts to rotate respectively therewith, an intermediate member held from rotation, a train of three pinions mounted upon one face of the intermediate member, one of said pinions engaging with the internal gear wheel mounted upon the first named shaft, the pinion at the opposite end of said train having its shaft extending through the member, a pinion mounted on the inner end of this shaft, and a pinion meshing with this last named pinion and also meshing with the internal gear wheel attached to the tubular shaft whereby to secure a rotation of the tubular shaft reverse to that of the first named shaft, said internal gear wheels having their rims abutting against the intermediate member and entirely housing the pinions carried thereby.

6. A shutter actuating mechanism for moving picture machines comprising a power driven shutter shaft, a shutter mounted thereon to rotate therewith, a shutter loosely mounted upon the shaft for independent rotation, and means for rotating the shutters in reverse directions including facing internal gear wheels having radial teeth, one rotating with the shutter shaft and the other rotating freely thereon, an intermediate fixed supporting member through which the shaft passes and disposed between the facing gear wheels, and a train of intermeshing spur pinions mounted upon the supporting member and transmitting power from one of said internal gear wheels to the other and rotating the last named internal gear wheels in a reverse direction to the first named internal gear wheel.

7. A shutter actuating mechanism for moving picture machines comprising a power driven shutter shaft, a shutter mounted thereon to rotate therewith, a shutter loosely mounted upon the shaft for independent rotation, and means for rotating the shutters in reverse directions including facing internal gear wheels having radial teeth, one rotating with the shutter shaft and the other rotating freely thereon, an intermediate fixed supporting member through which the shaft passes and disposed between the facing gear wheels, and a train of intermeshing spur pinions mounted upon the supporting member and transmitting power from one of said internal gear wheels to the other and rotating the last named internal gear wheel in a reverse direction to the first named internal gear wheel, said confronting internal gear wheels having peripheral flanges extending contiguous to the supporting member, said gear wheels thereby constituting a housing for the pinions.

In testimony whereof we hereunto affix our signatures in the presence of two witnesses.

HARRY E. DAVIS.
HARRY A. HARTMAN.

Witnesses:
EDWIN PAUL,
EARLE D. CORNELIUS.